United States Patent
Neubauer et al.

(10) Patent No.: US 9,168,791 B2
(45) Date of Patent: Oct. 27, 2015

(54) HEAVY DUTY TIRE

(75) Inventors: Robert Anthony Neubauer, Medina, OH (US); Dale Eugene Wells, Massillon, OH (US); Maurice Jacob Frank, North Canton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 592 days.

(21) Appl. No.: 12/534,456

(22) Filed: Aug. 3, 2009

(65) Prior Publication Data

US 2010/0032067 A1    Feb. 11, 2010

Related U.S. Application Data

(60) Provisional application No. 61/188,610, filed on Aug. 11, 2008.

(51) Int. Cl.
*B60C 11/11* (2006.01)
*B60C 11/03* (2006.01)

(52) U.S. Cl.
CPC ......... *B60C 11/0311* (2013.04); *B60C 2200/14* (2013.04)

(58) Field of Classification Search
CPC .................................................. B60C 11/0311
USPC ............... 152/209.1, 209.12, 209.13, 209.27, 152/902, 903; D12/571, 574, 579
See application file for complete search history.

(56) References Cited

U.S. PATENT DOCUMENTS

| | | | |
|---|---|---|---|
| 4,445,561 A | 5/1984 | Kono et al. | |
| D482,321 S * | 11/2003 | Hanna | D12/579 |
| D492,246 S | 6/2004 | Salvan et al. | D12/567 |
| 6,929,044 B1 | 8/2005 | Rooney | 152/209.12 |
| D586,731 S * | 2/2009 | Neubauer et al. | D12/579 |
| D614,118 S * | 4/2010 | Wells et al. | D12/579 |
| 2004/0211502 A1* | 10/2004 | Ono | 152/209.27 |
| 2006/0269636 A1* | 11/2006 | Miyamae | 425/35 |
| 2008/0078488 A1* | 4/2008 | Yoda | 152/209.26 |

FOREIGN PATENT DOCUMENTS

| | | | | |
|---|---|---|---|---|
| EP | 0423059 A2 | | 4/1991 | ............. B60C 11/08 |
| JP | S52-84607 | | 7/1977 | |
| JP | 03-200406 A | * | 9/1991 | |

(Continued)

OTHER PUBLICATIONS machine translation for Japan 07-081323 (no date).*

(Continued)

*Primary Examiner* — Steven D Maki
(74) *Attorney, Agent, or Firm* — June E. Rickey

(57) ABSTRACT

An off the road tire comprising a carcass, a tread located radially outward of the carcass, the tread having a plurality of lugs, the lugs extending radially outward from an inner tread and being located between first and second lateral tread edges, a first row of lugs extending from the tread lateral edge axially inwards toward the centerplane, a second row of lugs extending from the opposite tread lateral edge and axially inwards toward the centerplane and wherein the lugs of the first and second rows are separated by a plurality of shoulder grooves, a third row of lugs located between the first and second row of lugs, wherein all of the lugs in each row are aligned circumferentially, wherein the lugs in the third row have two or more ends formed by grooves.

9 Claims, 6 Drawing Sheets

(56) References Cited

FOREIGN PATENT DOCUMENTS

| | | | | |
|---|---|---|---|---|
| JP | 07-081323 | A | * | 3/1995 |
| JP | 2001-39124 | | | 2/2001 |
| JP | 2001055014 | A | | 2/2001 |
| JP | 2003-205706 | | | 7/2003 |
| JP | 2004-098914 | A | * | 4/2004 |
| JP | 2005014628 | | | 1/2005 |
| JP | 2006-198746 | | | 8/2006 |
| JP | 2007083822 | A | | 4/2007 |
| JP | 2007191093 | A | | 8/2007 |
| JP | 2007210552 | A | | 8/2007 |
| JP | 2008126943 | A | | 6/2008 |
| WO | WO02100664 | A1 | | 12/2002 |
| WO | WO-2006/057169 | A1 | * | 6/2006 |

OTHER PUBLICATIONS machine translation for Japan 2004-098914 (no date).*

* cited by examiner

HEAVY DUTY TIRE

This application claims the benefit of and incorporates by reference U.S. Provisional Application No. 61/188,610 filed Aug. 11, 2008.

FIELD OF THE INVENTION

The present invention relates to pneumatic tires, and more particularly to very large, wide base tires for use for example, on construction vehicles such as earth movers, and rigid haul dump trucks.

BACKGROUND OF THE INVENTION

In very large tires having a diameter of 50 inches or more, tire operating conditions can be severe because of the extreme tire loading and off-road conditions. Furthermore, the speed of the vehicles may be high, which can result in excessive heat build up in the tire. Thus it is desired to have an improved tire which is a cooler running tire.

DEFINITIONS

"Aspect Ratio" means the ratio of a tire's section height to its section width.

"Axial" and "axially" means the lines or directions that are parallel to the axis of rotation of the tire.

Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"net to gross ratio" means the ratio of the area of the tread in the footprint that contacts the road to the total area of the tread in the footprint.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which.

DETAILED DESCRIPTION OF THE INVENTION

Figure 1:
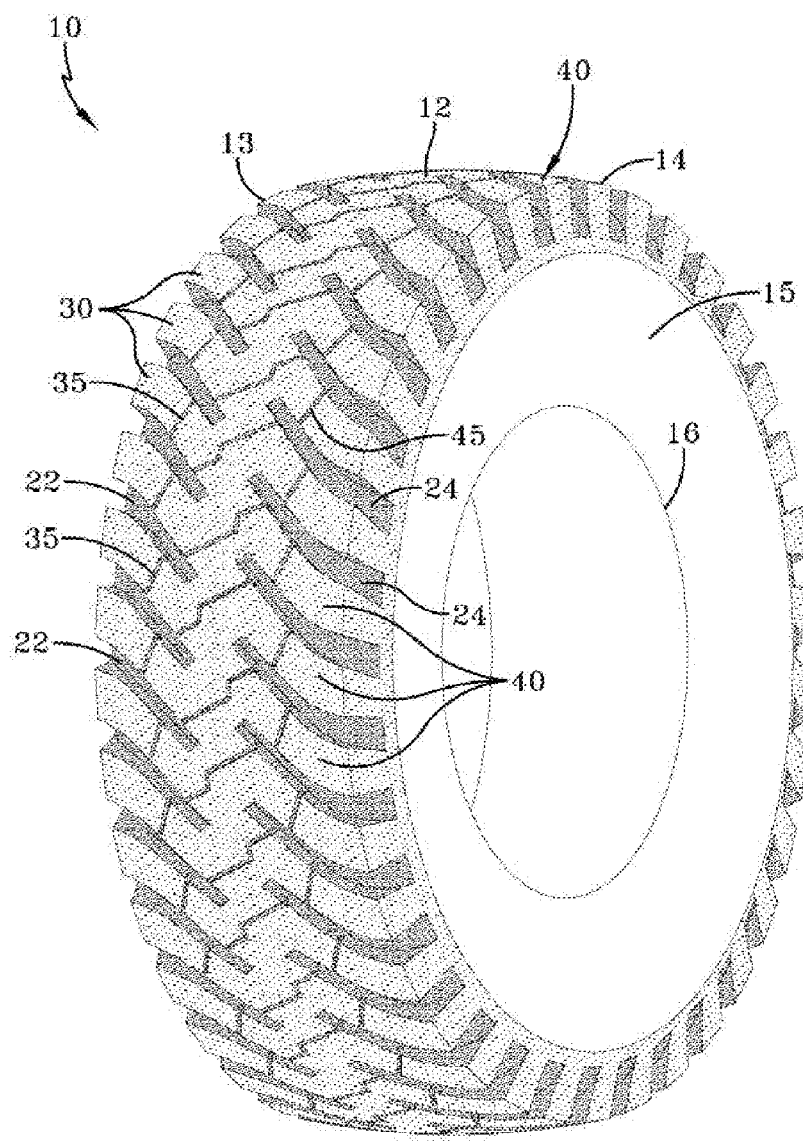
FIG. 1 is a perspective view of a tire of the present invention.

FIGS. 1-4 illustrate a first embodiment of a tire 10 of the present invention. The tire may have a nominal rim diameter of 35 inches or more. The tire 10 has an outer ground engaging tread portion 12 which terminates in axially outer lateral edges 13, 14. Sidewall portions 15 extend radially inward from the tread lateral edges 13, 14 and terminate in a pair of bead regions 16 having an annular bead core (not shown). The tire 10 is further provided with a carcass which has a reinforcing ply structure (not shown) which extends from bead region to bead region. The tire may further include breakers and other tire components known to those skilled in the art.

The tire tread 12 preferably has a non-directional tread pattern. The tread 12 comprises two rows of shoulder grooves 22, 24 wherein each row of shoulder grooves extend from a respective lateral tread edge 13, 14 towards the centerplane of the tread. The shoulder grooves 22, 24 do not cross the centerline of the tread and are angled at an angle θ1, θ2. The shoulder grooves in the first row 22 are circumferentially offset or staggered from the shoulder grooves in the second row 24. The shoulder grooves in the first row 22 are similarly shaped as the shoulder grooves in the second row, and have an angular orientation that is rotated about 180 degrees out of phase from the other row. The shoulder grooves are deep, and have a depth of 70-100% of the non skid tread depth, or NSK. The shoulder grooves 22, 24 are angled at an angle θ1, θ2 in the range of about 30 to 60 degrees, more preferably in the range of about 40 to 50 degrees. The high angled grooves provide forward and lateral traction.

The tread is further divided into three rows of lugs. A first row 30 of lugs is comprised of lugs which extend from the lateral tread edge 13 to axially inward to a first sipe 35. Each lug in row 30 is located between two shoulder grooves 22, and have the same angular orientation as the grooves 22. A first groove 35 extends in a circumferential direction across the lug joining the shoulder grooves 22. The first groove 35 depth varies from about 50% to about 80% NSK, more preferably about 75% NSK. The first groove has a width of about 0.25 inches but may vary in size.

The tread further comprises a second circumferentially spaced row of lugs 40. The second row is comprised of lugs which extend from the opposite lateral tread edge 14 and axially inward to a second sipe 45. Each lug 40 is located between two shoulder grooves 24. A second groove 45 extends in a circumferential direction across the lug 40 joining the shoulder grooves 24. The second groove 45 depth varies from about 50% to about 80% NSK, more preferably about 75% NSK. The second groove has a width of about 0.25 inches but may vary in size.

Figure 2:
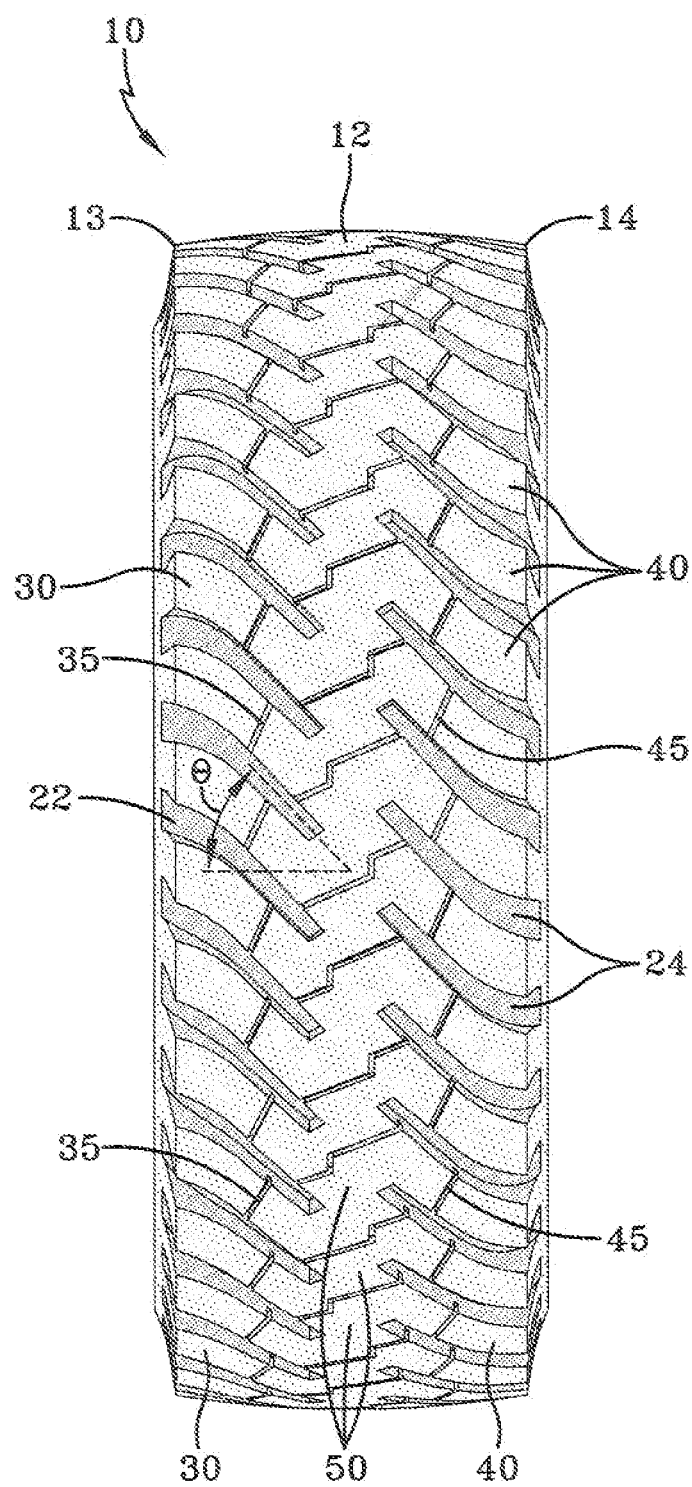
FIG. 2 is a front view of the tire of the present invention.
Figure 3:
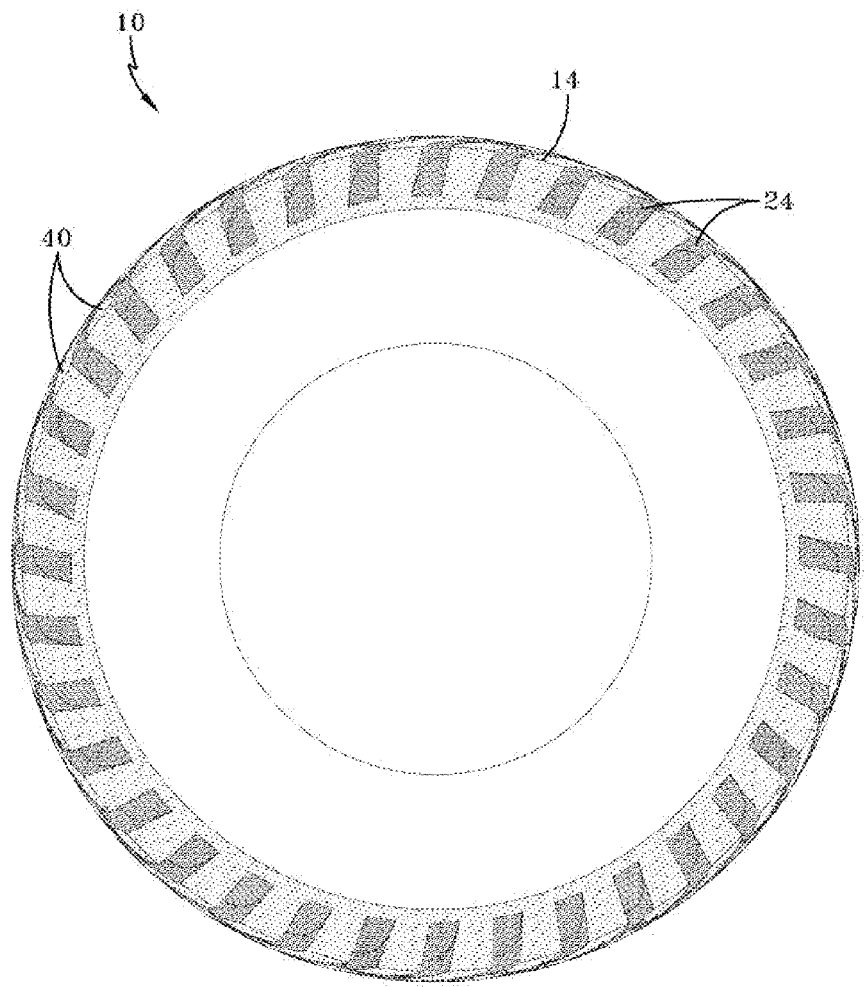
FIG. 3 is a side view of the tire of the present invention.

The tread further comprises a third circumferentially spaced row 50 of center lugs. The center lugs 50 may or not be the same size. As shown in FIG. 2, the center lugs alternate in an A B pattern of two different lug sizes, each lug size having a similar shape. The lugs are bordered by grooves 35 and grooves 45 on the lug axially outer ends. The lugs are further bordered by third and fourth grooves 55, 60. Grooves 55 and 60 are preferably zigzag shaped or non-linear to provide an interlocking feature. Grooves 55, 60 preferably have a portion 57, 62 which is aligned parallel with the circumferential plane. Grooves 55, 60 may also be angled 30 to 45 degrees from the axial direction. Grooves 35, 45, 55, and 60 together with the grooves 22, 24 function to provide a cooling path of air around the center lugs 50 to cool the lugs. The Grooves are spaced to maximize the cooling surface area around the lugs so that at any point on the surface of the lug, the distance from the point to a groove is minimized.

The center row of lugs 50 have an irregular, non-symmetrical shape, with multiple edges. At least two borders or grooves of the lugs are formed from opposed zigzag grooves 55, 60. The center row of lugs have an axial width which ranges from about 50% to about 75% of the axial width of the tread from edge to edge. The outer edges of the shoulder grooves extend into the center lugs, so that the center lugs are irregular in shape.

The overall net to gross ratio of the tire ranges from about 60 to about 80, more preferably about 65 to 75, and most preferably in the range of about 68 to 72.

Figure 5:
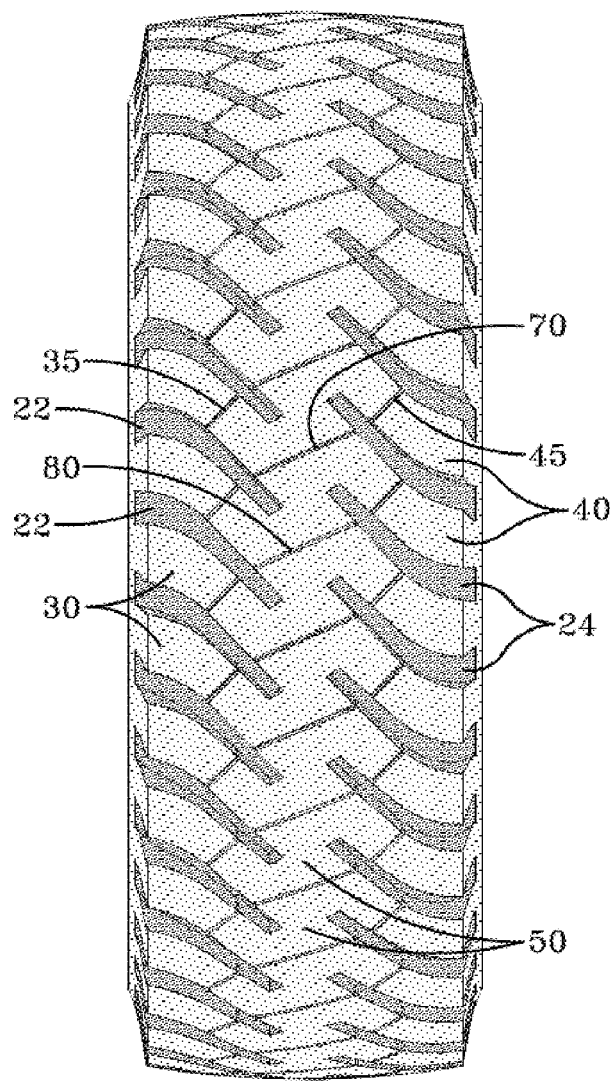
FIG. 5 is a front view of a second embodiment of a tire of the present invention.

FIG. 5 illustrates a second embodiment of the tire. The tire tread has all the features as stated above, except for the following. Grooves 55, 60 are replaced with parallel grooves 70, 80. Grooves 35, 45 may also be parallel. The center lugs are very similar in size, if not the same. The center lugs 50 are irregular in shape and are non symmetrical. The center lugs are large, and have a width which may range from about 50% to about 75% of the tire tread width. The center lugs are angled with respect to the axial direction. The shoulder grooves subtend or extend into the center lugs. Each center lug is bounded by linear grooves 70, 80 which are parallel to each other, and by portions of the shoulder grooves 22, 24. The center lugs are further bounded by grooves 35, 45.

Figure 4:
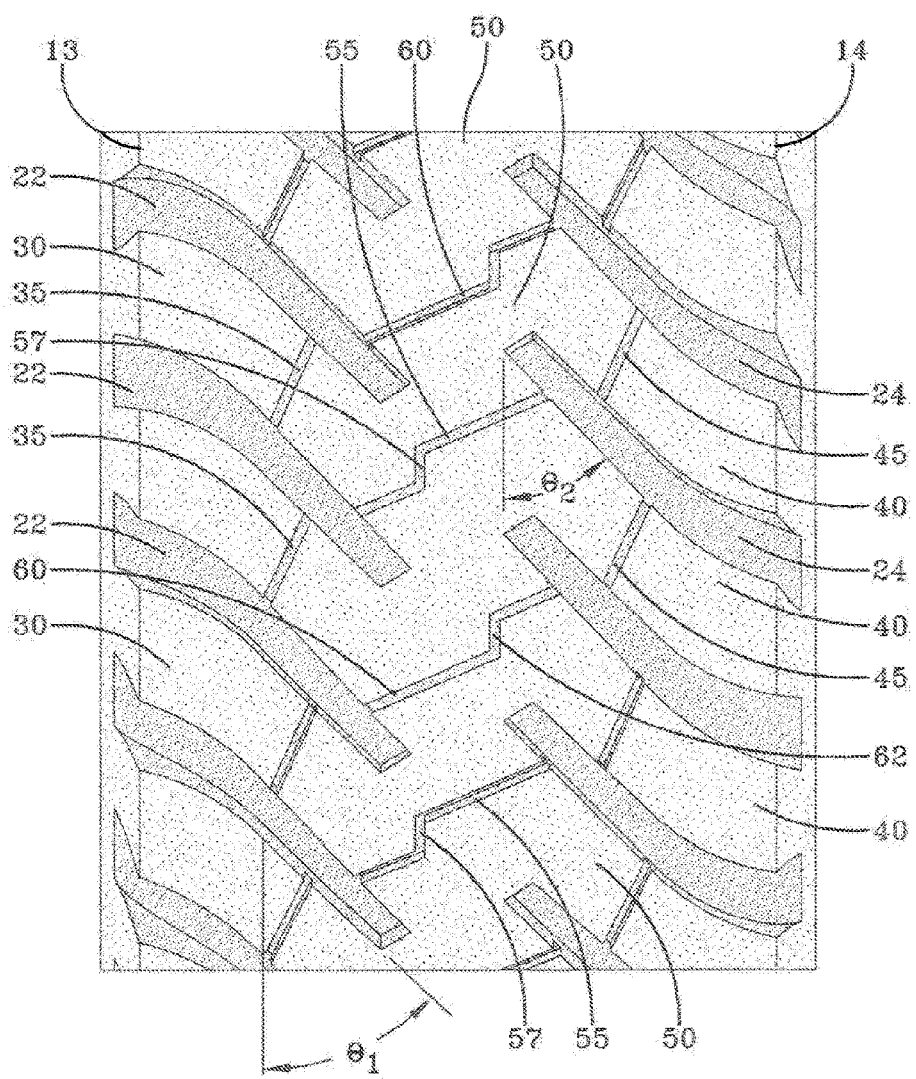
FIG. 4 is a close up front view of the tire footprint.
Figure 6:
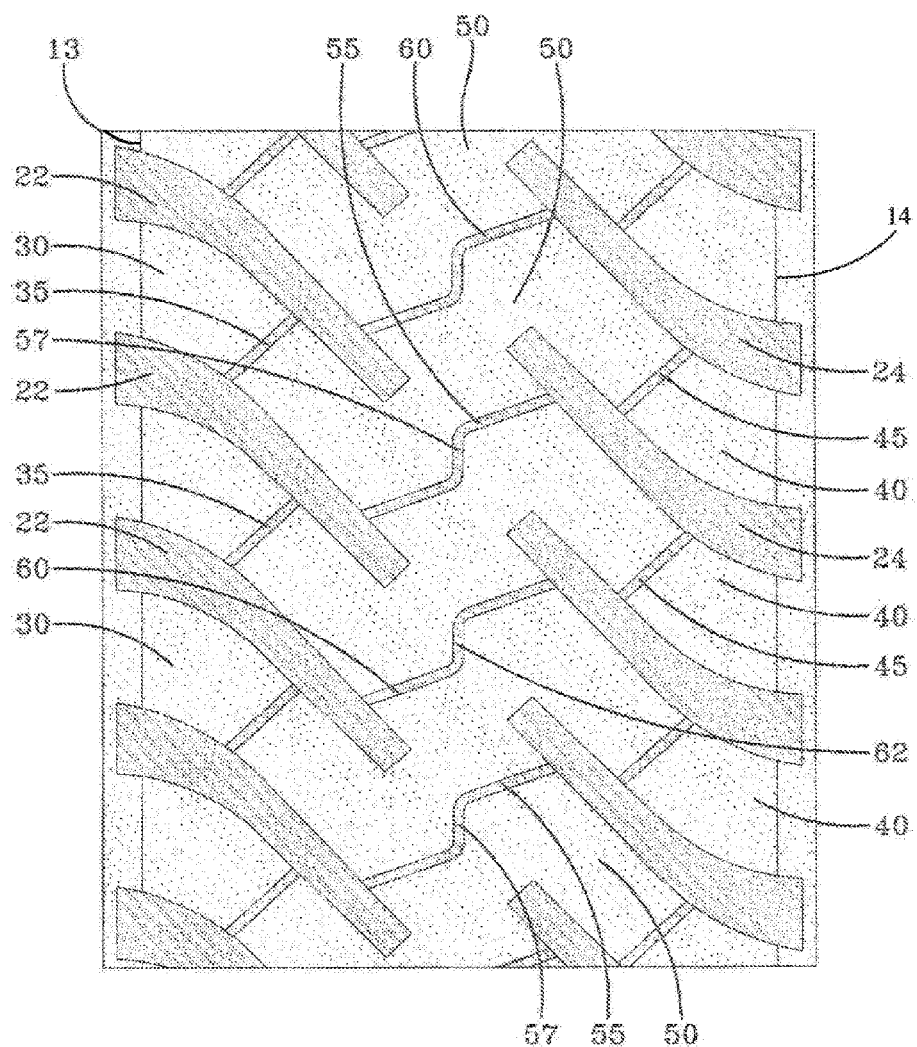
FIG. 6 is a front view of a third embodiment of a tire of the present invention.

FIG. 6 is a similar embodiment to FIG. 4, but the center lugs are more similar in size. There are also slight variations in the position of the groove Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An off the road tire comprising a carcass, a tread located radially outward of the carcass, the tread having a plurality of lugs, the lugs extending radially outward from an inner tread and being located between first and second lateral tread edges, a first row of lugs extending from a first tread lateral edge axially inwards toward the centerplane, a second row of lugs extending from the opposite tread lateral edge and axially inwards toward the centerplane and wherein the lugs of the first and second rows are separated by a plurality of angled shoulder grooves, wherein an angle of each of the shoulder grooves is in the range of 40 to 50 degrees from the axial direction, wherein a third row of lugs is located between the first and second row of lugs, wherein each shoulder groove terminates in an ending positioned within a third row lug, wherein all of the lugs in each row are aligned circumferentially, wherein the lugs in the third row have a first and second opposed zigzag groove, wherein the first and second opposed zigzag grooves each have a portion extending in the circumferential direction, wherein said portions are not circumferentially aligned with respect to each other.

2. The tire of claim 1 wherein the lugs of the third row have an axially inner end and an axially outer end, each end being formed by a groove.

3. The tire of claim 1 wherein the lugs of the third row have a circumferentially inner end and a circumferentially outer end formed by the first and second opposed zigzag grooves, respectively.

4. The tire of claim 1 wherein the lugs of the third row have an axial width which ranges from about 50% to about 75% of the axial width of the tread.

5. The tire of claim 1 wherein the net to gross ratio of the tire ranges from about 60 to about 80.

6. The tire of claim 1 wherein the net to gross ratio of the tire ranges from about 68 to about 72.

7. The tire of claim 1 wherein the third row of lugs are not the same size.

8. The tire of claim 1 wherein the third row of lugs alternate in a pattern AB, wherein A is a first lug size and B is a second lug size different than the first lug size.

9. The tire of claim 1 wherein each of the first and second opposed zigzag grooves are only connected to a pair of the shoulder grooves.

* * * * *